United States Patent
Brueck et al.

(10) Patent No.: US 7,978,403 B2
(45) Date of Patent: Jul. 12, 2011

(54) IMAGING INTERFEROMETRIC MICROSCOPY

(75) Inventors: Steven R. J. Brueck, Albuquerque, NM (US); Alexander Neumann, Albuquerque, NM (US); Yuliya V. Kuznetsova, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 540 days.

(21) Appl. No.: 12/117,334

(22) Filed: May 8, 2008

(65) Prior Publication Data
US 2009/0052019 A1    Feb. 26, 2009

Related U.S. Application Data

(60) Provisional application No. 60/917,170, filed on May 10, 2007.

(51) Int. Cl.
*G02B 21/00* (2006.01)
(52) U.S. Cl. .............. 359/370; 356/450; 382/284
(58) Field of Classification Search .............. 359/370; 382/284; 356/450
See application file for complete search history.

(56) References Cited

U.S. PATENT DOCUMENTS

2009/0310214 A1* 12/2009 Brueck et al. .............. 359/370

* cited by examiner

*Primary Examiner* — Alessandro Amari
(74) *Attorney, Agent, or Firm* — MH2 Technology Law Group LLP

(57) ABSTRACT

Exemplary embodiments provide an image interferometric microscope (IIM) and methods for image interferometric microscopy. The disclosed IIM can approach the linear systems limits of optical resolution by using a plurality of off-axis illuminations to access high spatial frequencies along with interferometric reintroduction of a zero-order reference beam on the low-NA side of the optical system. In some embodiments, a thin object can be placed normal to the optical axis and the frequency space limit can be extended to about $[(1+NA)n/\lambda]$, where NA is the numerical-aperture of the objective lens used, n is the refraction index of the transmission medium and $\lambda$ is an optical wavelength. In other embodiments, tilting the object plane can further allow collection of diffraction information up to the material transmission bandpass limited spatial frequency of about $2n/\lambda$.

22 Claims, 7 Drawing Sheets

IMAGING INTERFEROMETRIC MICROSCOPY

RELATED APPLICATIONS

This application claims priority from U.S. Provisional Patent Application Ser. No. 60/917,170, filed May 10, 2007, which is hereby incorporated by reference in its entirety.

GOVERNMENT INTEREST

This invention was made with U.S. Government support under Contract No. HR0011-05-1-0006 awarded by the Defense Advanced Research Projects Agency. As a result, the U.S. Government has certain rights in this invention.

FIELD OF THE INVENTION

This invention relates generally to an imaging interferometric microscopy, and, more particularly, to an imaging interferometric microscope and methods for providing an optical resolution approaching the linear systems limits of the transmission medium extending to $2n/\lambda$ where n is the medium refractive index and $\lambda$ is an optical wavelength.

BACKGROUND OF THE INVENTION

Microscopy is among the oldest applications of optical science and remains one of the most widely used optical technologies. In spite of impressive results obtained by fluorescent microscopy, exceeding the classical diffraction limit, non-fluorescent transmission/reflection microscopy remains an important field of modern research.

Traditional microscopy approaches are restricted in resolution by the low-pass filter characteristics of the optical system. As is well-known, the bandpass of a lens is a circle of radius $NA/\lambda$ where NA is the numerical aperture of the lens and $\lambda$ is the optical wavelength. These limitations are discussed in many texts, for example, in the text entitled "Principles of Optics" by Born and Wolff (Sixth Ed., 1980, Cambridge University Press), and in the text entitled "Introduction to Fourier Optics" by J. W. Goodman (2005, Roberts and Co.).

Thus, there is a need to overcome these and other problems of the prior art and to provide an imaging interferometric microscope to extend the collected spatial frequencies for improving the image, and methods for its use.

SUMMARY OF THE INVENTION

According to various embodiments, the present teachings include a method for microscopy. In this method, an object can be illuminated at an object plane using an illumination beam having an illumination angle to the object plane, wherein the illumination can include a plurality of illumination angles. A sub-image can then be recorded at an image plane based on the illumination at the object plane, wherein the sub-image corresponds to one region of a plurality of spatial frequency regions of a frequency space. Each sub-image that corresponds to each region of the plurality of spatial frequency regions based on each illumination angle of the plurality of illumination angles can be enhanced using signal processing algorithms. Each enhanced sub-image of the plurality of sub-images can then be combined together to assemble a composite image of the object. The frequency space covered in the plurality of sub-images can extend to $(1+NA)n/\lambda$ or less, wherein NA is a numerical-aperture of an objective lens, $\lambda$ is an optical wavelength of the illumination beam, and n is a refractive index of a transmission medium. In various embodiments, the frequency space coverage can be extended to about $2n/\lambda$ or less by incorporating the plurality of illumination angles with one or more tilts of the object plane relative to an optical axis of a collection optical system, wherein n is a refractive index of the transmission medium and $\lambda$ is an optical wavelength.

According to various embodiments, the present teachings also include an apparatus for microscopy. The microscopic apparatus can include an illumination system to provide an incident beam onto an object at an object plane, wherein the incident beam can include an adjustable illumination angle to the object plane. The apparatus can also include a first optical system having an objective lens disposed to project an image of the object plane onto an electronic image device, and a second optical system disposed to collect one of a transmitted and reflected zero-order beam of the illumination through the object, bring one of the transmitted and the reflected zero-order beam around the objective lens, and re-insert the one of the transmitted and the reflected zero-order beam into an optical path on a low-NA (numerical aperture) side of the objective lens so as to interfere with an diffracted information from the object transmitted through the objective lens at the image device.

According to various embodiments, the present teachings also include an apparatus for microscopy. The apparatus can include an illumination system for providing an incident beam on an object at an object plane and having an adjustable illumination angle to the object plane. In addition, the apparatus can include a first optical system having an objective lens disposed to project an image of the object plane onto an electronic image device; and a second optical system disposed to collect a fraction the illumination before the object plane, bring the illumination fraction around the objective lens, and re-insert the illumination fraction into an optical path on the low-NA (numerical aperture) side of the objective lens so as to interfere with a diffracted information from the object transmitted through the objective lens at the image device.

According to various embodiments, the present teachings further include a method for microscopy. In this method, a first plurality of sub-images of an object at an object plane with a plurality of illumination beams substantially within the NA of an optical system to the object plane can be recorded, followed by electronically storing the first plurality of sub-images that a composite sub-image corresponds to a real-space image with low spatial frequency content up to about $NA/\lambda$ (where $\lambda$ is the wavelength of the illumination). One or more additional sub-images of the object plane with the object removed and with blocking the zero-order transmission of the illumination can then be optionally recorded. A linear imaging sub-image can be obtained by using signal processing. The method can also include recording one or more additional sub-images of the object plane with each covering different portions of spatial frequency space; and combining the first plurality of sub-images and the one or more additional sub-images to form a composite image of the object including spatial frequencies within all of the regions of frequency space.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIGS. 3A-3B depict frequency space coverage for exemplary object patterns using the IIM optical arrangement shown in FIG. 1A in accordance with the present teachings.

DESCRIPTION OF THE EMBODIMENTS

Figure 1B:
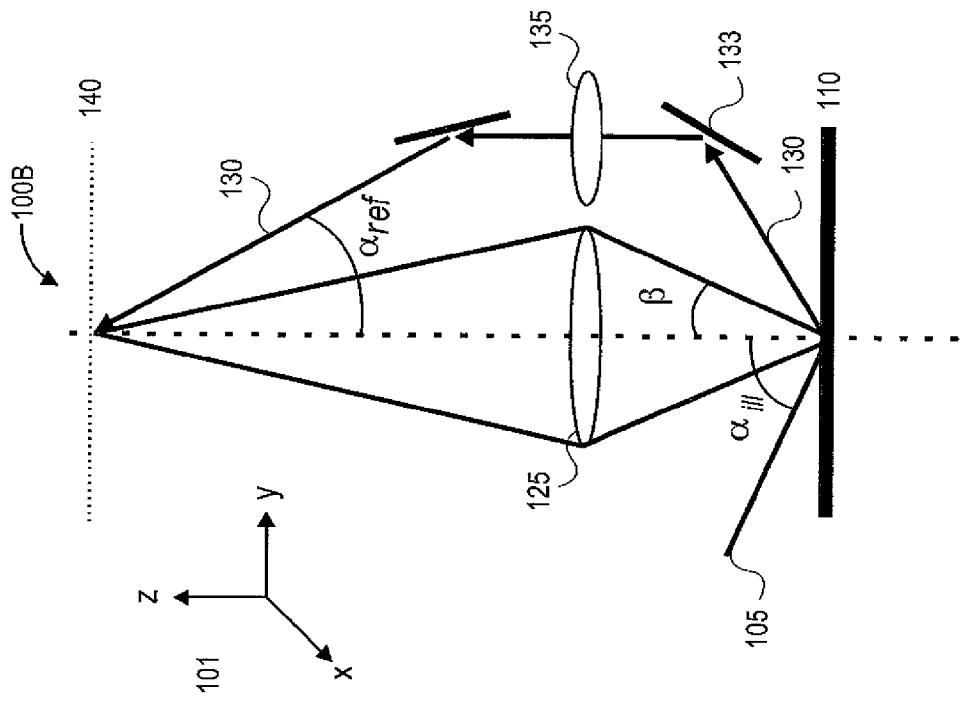
FIG. 1B depicts an exemplary optical arrangement of the imaging interferometric microscope (IIM) for a reflection geometry in accordance with the present teachings.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Exemplary embodiments provide an image interferometric microscope (IIM) and methods for imaging interferometric microscopy. The disclosed IIM can approach the linear systems limits of optical resolution by using a plurality of off-axis illuminations to access high spatial frequencies along with interferometric reintroduction of a plurality of zero-order reference beams (one for each off-axis illumination) on the low-NA side of the optical system. In embodiments with an object plane normal to the optical axis, the frequency space limit can be about $[(1+NA)n/\lambda]$, where NA is the numerical-aperture for the objective lens used, n is the refractive index of the transmission medium and $\lambda$ is an optical wavelength. In other embodiments, tilting the object plane can further allow collection of diffraction information up to the material transmission bandpass limited spatial frequency of about $2n/\lambda$. This is because the tilting allows collection of diffracted information at a larger angle from the incident beam, corresponding to higher spatial frequency information.

For illustrative purposes herein, the refractive index n can be implicitly subsumed in the definition of the wavelength, i.e., $\lambda = \lambda_{vacuum}/n$. For example, when IIM microscopic experiments are carried out in air having n=1, the frequency space limit can be about $[(1+NA)/\lambda]$ for a thin normal object plane, and can be about $2/\lambda$ for a tilted object plane.

In various embodiments, the method for IIM can include, for example, combining multiple sub-images; reconstructing and restoring the combined sub-images (e.g., by electronic merging of digitally stored images); applying various signal processing enhancements including, but not limited to, mean square error metrics, to the experimental results for an improved image resolution. In general, there is a large body of techniques provided by the image processing community that are applicable in specific applications of IIM. In a further embodiment, for binary objects, sigmoidal filtering of the image can be used to provide significant resolution improvement.

The disclosed IIM can provide many advantages. For example, the final composite image can have a resolution at the linear system limit imposed by the transmission medium ($>\sim\lambda/4$ where $\lambda$ is the wavelength in the transmission medium), while the depth-of-field, field-of-view and working distance associated with the low-NA optical system are retained.

FIGS. 1-7 depict exemplary embodiments for the IIM optical arrangements and algorithms for image reconstruction and restoration in accordance with the present teachings.

Exemplary embodiments further include image quality estimation based on mean square error metrics, sub-image additions, and the application of the mean square error method (MSE) to the experimental results.

Specifically, FIGS. 1-4 depict three exemplary IIM arrangements having an extension of frequency space coverage to about $(1+NA)/\lambda$ as described herein. In various embodiments, the extension of the frequency space coverage can be obtained by using multiple offset sub-images in multiple directions as necessary to capture the diffracted information from the object and introducing a signal-processing algorithm to deal with the resulting overlaps in the frequency space coverage. By using such frequency limit extension method, a better resolution can also be accessible than even using a high-NA objective with conventional illumination as a result of the well-known decreasing modulation transfer function at high frequencies for incoherent illumination. For example, the Rayleigh resolution for a 0.9-NA objective at a 633-nm wavelength can be about 422 nm (i.e., $0.6\lambda/NA$).

Figure 1A:
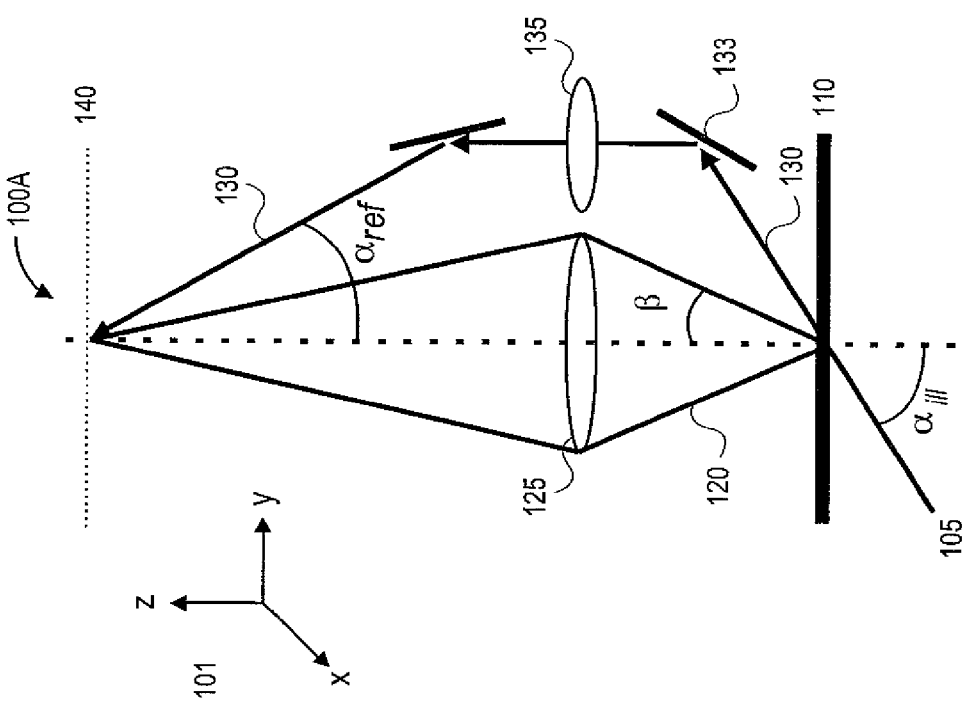
FIG. 1A depicts an exemplary optical arrangement of the imaging interferometric microscope (IIM) for a transmission geometry in accordance with the present teachings.

FIG. 1A depicts an exemplary optical arrangement 100A of the imaging interferometric microscope (IIM) in accordance with the present teachings. For illustrative purpose throughout the description, an exemplary system of transmission microscopy is employed. However, one of ordinary skill in the art will understand that comparable optical arrangements 100B for reflection microscopy, as illustrated in FIG. 1B, can be available and can be included without explicit reference. For example, FIG. 1B shows the comparable reflection microscopy geometry in accordance with the present teachings.

As shown in FIGS. 1A-1B, the depicted optical arrangement 100A-B can include an oblique (i.e., off-axis) illumination 105 having an incidence angle $\alpha_{ill}$ with respect to the normal to the object plane. The off-axis illumination 105 can be incident on an object 110, providing diffracted optical information 120 from the object 110 and a zero-order beam 130. The off-axis illumination 105 can shift some of the higher spatial frequencies diffracted from the object 110 into the bandpass of the objective lens 125 with an optical axis aligned along the normal to the object plane. In an exemplary embodiment the incidence angle $\alpha_{ill}$ can be beyond the collection angle of the objective lens 125. The zero-order beam 130 can be brought around the objective lens 125 using a reflection mirror 133 through an auxiliary optical system 135, and interferometrically reintroduced on the low NA side of the objective lens 125. The optical system 135 can be used to collect the zero-order transmission, adjust its divergence, direction and phase and re-inject it onto the image plane 140. The interference between this zero-order beam 130 and the diffracted beams 120 transmitted through the objective lens 125 can shift the collected diffracted information back to high frequency and can reconstruct a sub-image covering a portion of the available spatial frequency space. A coordinate system 101 can be illustrated in FIG. 1A for convenience in subsequent descriptions. In this coordinate system, the object plane can be the (x,y) plane and the plane of incidence can be the (x,z) plane Alternatively, instead of using the zero-order transmission, which might be blocked by the objective-lens mount, a portion of the illumination beam can be split off and directed around the objective lens as shown in FIG. 2A. FIG. 2A depicts an alternative optical arrangement 200 for the disclosed IIM in accordance with the present teachings. As compared with the optical arrangement 100A in FIG. 1A, the optical arrangement 200A can include, for example, a beam splitter 107. In this manner, an illumination beam 102 can be partially reflected by the beam splitter 107 to define an effective 0-order reference beam 130 and partially transmitted by the beam splitter 107 to define an off-axis illumination 105, that can be incident on an object 110, providing diffracted optical information 120 from the object 110 and the effective 0-order reference beam 130. The reference beam 130 can be brought around the objective lens 125 using a reflection mirror 133 through an auxiliary optical system 135, and interferometrically reintroduced on the low NA side of the objective lens 125.

Figure 2B:
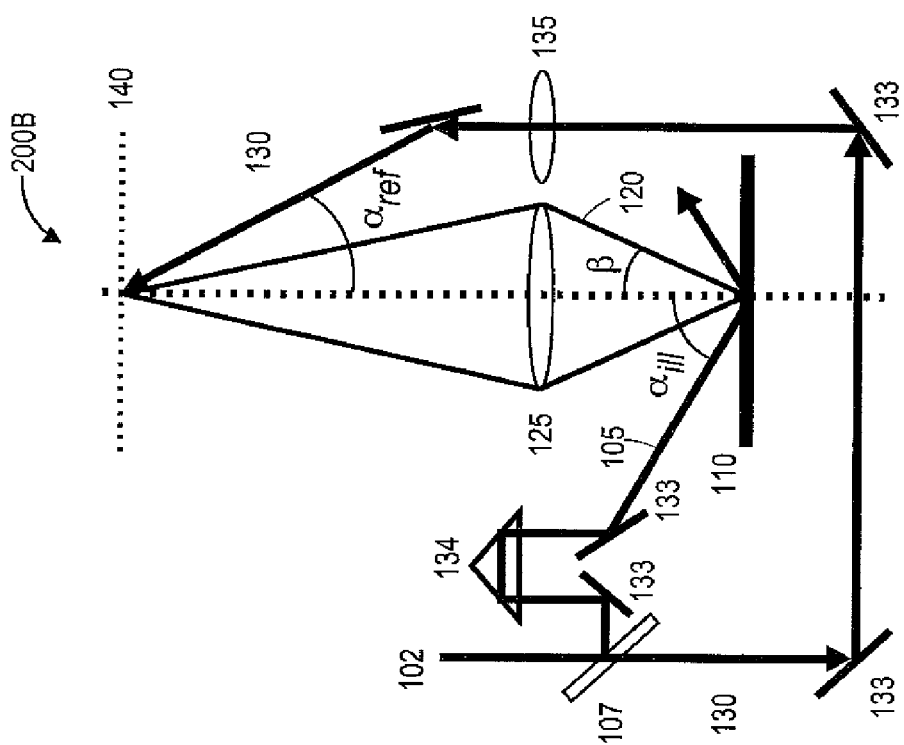
FIG. 2B depicts another exemplary optical arrangement of the imaging interferometric microscope (IIM) for a reflection geometry in accordance with the present teachings.
Figure 2A:
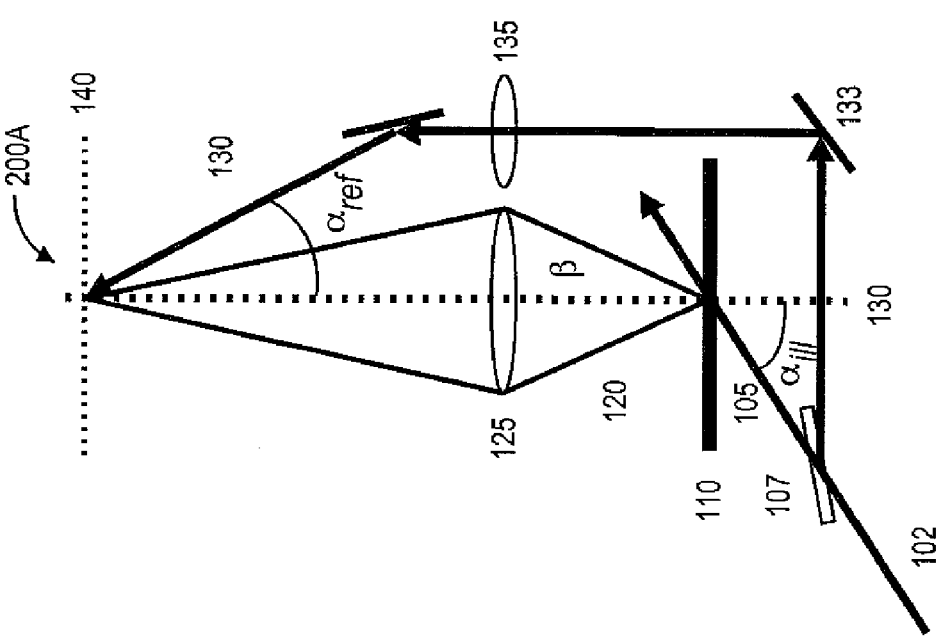
FIG. 2A depicts another exemplary optical arrangement of the imaging interferometric microscope (IIM) for a transmission geometry in accordance with the present teachings.

In various embodiments for both configurations shown in FIGS. 1-2, it is important that the path lengths of the two arms of the interferometer from the object plane 110 to the image plane 140 in the optical configuration of FIGS. 1A-1B or from the beam splitter 107 to the object plane 110 in the optical configuration of FIG. 2A can be maintained with an optical path length difference within the coherence length of the optical source. This can be a requirement of the interferometric reintroduction. In various embodiments, additional optical components, for example, a pair of mirrors 133 and prism 134, can be added to ensure this condition as shown in FIG. 2B. In various embodiments, the IIM optical arrangements 100A-B and 200A-B can be applicable to Manhattan objects (on an x, y grid) as well as arbitrary objects. Note that although Manhattan geometries are used throughout the description herein for illustrative purposes, it is intended that the disclosed IIM can be applicable to other geometries, for example, fully arbitrary objects.

In conventional optical microscopy, any lens is a low-pass filter with a bandwidth corresponding to $NA/\lambda$, the corresponding resolution, often referred to as the Rayleigh resolution, is about $0.6\lambda/NA$ where the numerical prefactor depends on both the pattern and the illumination system. Therefore, for an NA=0.4 objective lens used with a He—Ne laser illumination source ($\lambda$=633 nm), the Rayleigh resolution is limited to about 950 nm.

As disclosed herein in FIG. 1, the Rayleigh resolution can be improved by using off-axis illumination to provide an increased effective NA ($NA_{eff}$) according to equation (1) for an inclined (off-axis) incident beam:

$$NA_{eff} = NA + \sin a_{ill} \qquad (1)$$

where $a_{ill}$ can be the angle of incidence ranging from about 0 degree to about 90 degree, and $NA_{eff}$ can be a convenient short-hand descriptor that reflects the increased frequency space content of the images.

Note that the resulting images are not the same as those which would be obtained using an objective lens with a physical NA equal to $NA_{eff}$. As shown in FIG. 1 or FIG. 2, in the case when $\sin a_{ill} > NA$, the zero-order transmission is shifted outside of the imaging pupil plane (i.e., dark-field illumination); and an interferometric reintroduction of the zero-order (or reference) beam on the low NA side of the lens is necessary to restore the image frequencies. The incident angle of the zero-order reference beam, indicated as $a_{ref}$, can be adjusted to shift the spectral content to the appropriate image high frequencies. Changing both $a_{ill}$ and $a_{ref}$ can lead to various different frequency coverages.

In various embodiments, rotation of the illumination beam and the reference beam within the plane of incidence (x,z) (i.e., giving a radial coverage) or the object or the illumination and reference beams around the optical axis (in the x,y plane), (i.e., giving a circumferential coverage) can provide a 2D coverage of the high spatial frequency diffracted information from the object.

For example, Manhattan geometry patterns can often be imaged with a 90° rotation of the optical system around the optical axis. For more general objects, a number of rotation angles, depending on the NA and the offset angles as well as the specifics of the object, can be used. Equivalently, the optical system can be held fixed and the object plane can be rotated about the optical axis, which is often, but not always, a more convenient approach.

Figure 3B:
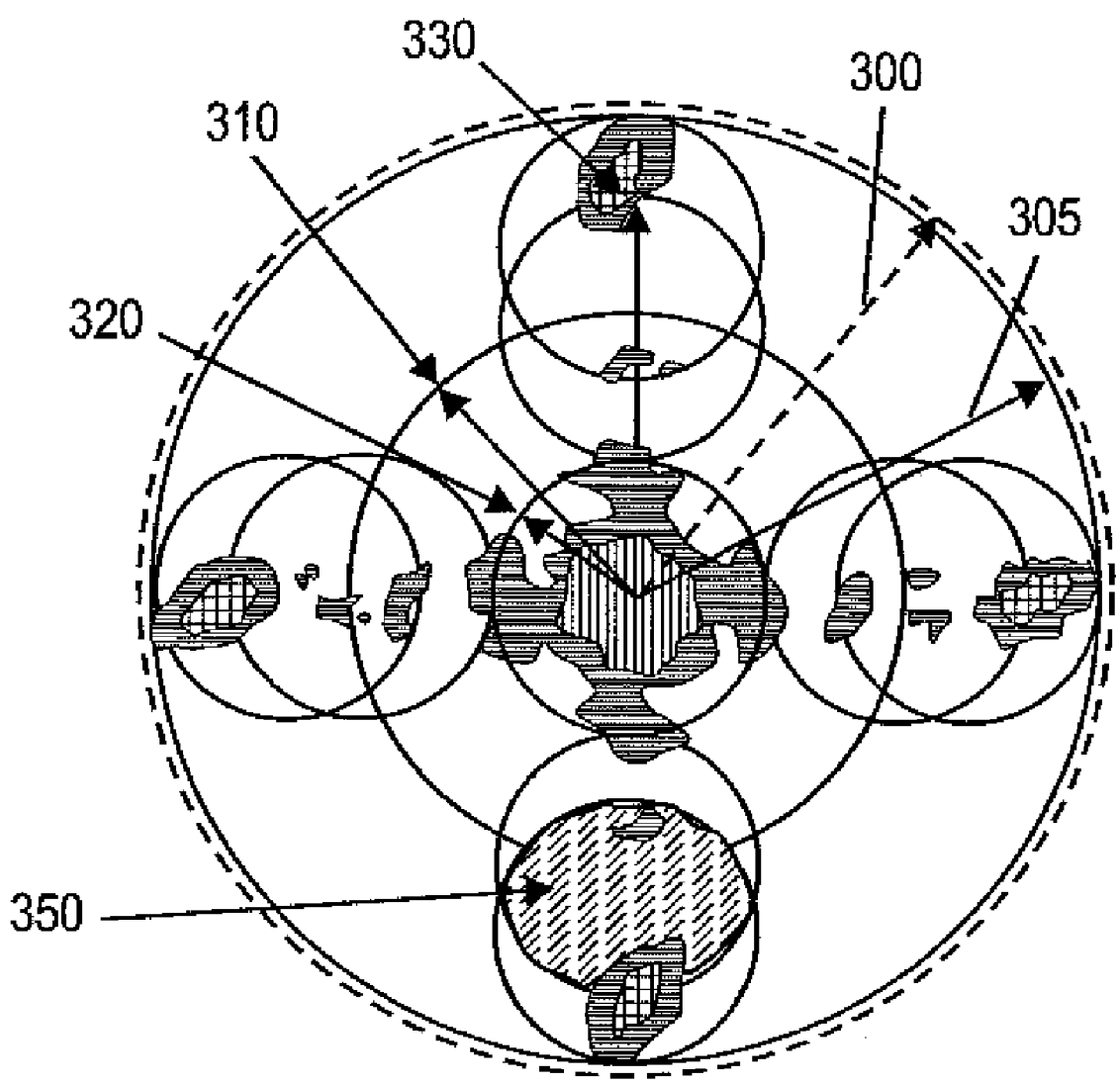

FIGS. 3A-3B depict frequency space coverage for exemplary object patterns using the IIM optical arrangement 100A shown in FIG. 1A in accordance with the present teachings Specifically, FIG. 3A depicts an exemplary object pattern, while FIG. 3B depicts a resulting frequency space coverage for the pattern of FIG. 3A as a result of the square-law intensity response. As a result of the square law response of the imaging camera, the resulting frequency coverage for a single sub-image can be represented by a pair of circles of radius NA/λ shifted away from zero frequency as a result of the off-axis illumination as shown in FIG. 3B.

The total electric-field transmission through an arbitrary object illuminated by a tilted (off-axis) plane wave (assumed to be periodic on large scale to allow Fourier sums rather than Fourier integrals) and the optical system can be given by:

$$A'_{0,0}\exp(-i\omega_{off}x)e^{i\gamma^{off}_{0,0}z} + \sum_{k,l\neq 0} T(k\omega_x - \omega_{off}; l\omega_y)A_{k,l}\exp[ix(k\omega_x - \omega_{off}) + il\omega_y y]e^{i\gamma^{off}_{k,l}z} \quad (2)$$

where x, y and z can be orthogonal spatial coordinates as shown in FIG. 1A; $\omega_{off}=2\pi \sin(\alpha_{ill})/\lambda$ can be the spatial frequency offset arising from the off-axis illumination at angle $\alpha_{ill}$, the prime on the $A'_{0,0}$ can refer to the re-injected 0-order (e.g. the reference beam), $\omega_x$, $\omega_y$ can be the discrete spatial frequency increments of the Fourier summation; $\gamma^{off}_{k,l} \equiv [(2\pi n/\lambda)^2 - (k\omega_x - \omega_{off})^2 - (l\omega_y)^2]^{1/2}$ with n the refractive index of the transmission medium (=1 for air); {k,l} can be the set of integers, for which $(\gamma^{off}_{k,l})^2 > 0$, that is the range of integers for which the diffracted beams are within the band pass of the medium and are propagating in the z-direction, away from the object. In an exemplary embodiment, a scalar electromagnetic model can be adequate since the NA of the microscope system is relatively modest.

The transmission function of the optical system $T(k\omega_X; l\omega_Y)$ can be a simple band pass function as following:

$$T(k\omega_X; l\omega_Y) = \begin{cases} 1 & \text{for } \sqrt{(k\omega_X)^2 + (l\omega_Y)^2} \leq \omega_{MAX} = \frac{2\pi NA}{\lambda} \\ 0 & \text{else} \end{cases} \quad (3)$$

Taking the square of expression (1) provides the intensity on the imaging plane:

$$|A'_{0,0}|^2 + \ldots \quad (dc \text{ offset}) \quad (4)$$

$$\sum_{k,l\neq 0} A'_{0,0}A^*_{k,l}T(k\omega_x - \omega_{off}; l\omega_y)\exp[ik\omega_x x + il\omega_y y]e^{i(\gamma^{off}_{0,0}-\gamma^{off}_{k,l})z} +$$

$$c.c.+ \ldots \quad (\text{imaging})$$

$$\sum_{k,l\neq 0'} \sum_{k',l'\neq 0} A_{k,l}T(k\omega_x - \omega_{off}; l\omega_y)A^*_{k',l'}T(k'\omega_x - \omega_{off}; l'\omega_y) \times$$

$$\exp[i(k=k')\omega_x x + i(l-l')\omega_y y]e^{i(\gamma^{off}_{k,l}-\gamma^{off}_{k',l'})z} \ldots \quad (\text{dark field})$$

where the three terms on separate lines can correspond to (top) a constant term, (middle) the linear imaging terms and (bottom) the dark field cross-correlation image. Subtracting out the dark field terms (by taking an image with the reference zero-order blocked so that only the third term survives) can provide a sub-image that accurately captures the spatial frequency components that are transmitted through the optical system. Note that the linear imaging terms (middle line) can be at the correct frequencies and that the offset illumination angle can have cancelled out of the expression except for the filter transmission functions. The frequency space coverage resulting from the linear imaging terms can correspond to the pairs of offset circles in FIG. 3B. Note that FIG. 3B shows the results on an on-axis sub image (central small circle) and of four pairs of off-axis images, two each in the x- and y-directions with a smaller $\alpha_{ill}$ (inner offset circles) and a larger $\alpha_{il}$ (outer offset circles). The square law detection can result in both the direct and the complex conjugate circles. This is equivalent to single-sideband communications approaches. Changing the illumination angle (and the angle of the reference beam) can change $\omega_{off}$ allowing recording of a different region of frequency space as shown by the two sets of offset circles in each direction in FIG. 3B. Rotation of the sample, or of the off-axis optical beams, about the imaging system optical axis allows collection of spatial frequency information in an additional directions, as indicated by the orthogonal sets of offset circles in FIG. 3B. In what follows, the total image (the sum of all three sets of terms above) can be referred to as the intensity sub-image; the measured intensity image with the zero-order reference beam blocked can be referred to as the dark field sub-image; and the image resulting from subtracting the dark-field image from the intensity image can be referred to as the linear sub-image. The linear sub-image can be so-named because the Fourier coefficients are directly (linearly) proportional to the Fourier coefficients of the object. Adding together multiple linear sub-images with non-overlapping frequency coverage can reconstruct the object image.

As shown in FIG. 3A, the exemplary pattern can include equal line/space pairs. The line width of the narrower features can be, e.g., of about 240 nm, which is often referred to as the CD or critical dimension, reflecting lithography community usage.

In this exemplary experiment, an NA=0.4 objective lens and a He—Ne laser (λ=633 nm) is used for the IIM. As shown in FIG. 3B, the outer circle 300 can represent the overall frequency space limit of about 1.4/λ for this optical configuration having 0.4 NA objective. The two smaller concentric circles 310 and 320 correspond to the spatial frequencies, e.g., of about 0.4/λ and about 0.8/λ, respectively, accessed by traditional coherent or incoherent illumination. The inner sets of shifted circles 330 in the x- and y-directions can extend the captured frequency range to 3NA/λ (i.e., 1.2/λ) or a minimum resolution (half pitch) to about ~260 nm for objects with edges in the x- and y-directions. The two additional sets of shifted circles show the frequency space coverage added with additional offset sub-images with a larger tilt of the illumination beam 105 extending to (1+NA)/λ.

In an exemplary microscopic process, the first offset can be $\sin(\alpha_{ill})/\lambda \sim 2NA/\lambda$ corresponding to an illumination angle $\alpha_{ill}$ of ~53° (see 310 in FIG. 3B), and the second illumination angle $\alpha_{ill}$ can be about 80° corresponding to a maximum collected spatial frequency of about 1.38/λ (see 305 in FIG. 3B) from equation 1. These numbers are lower than the ultimate limit of (1+NA)/λ=1.4/λ at 300 in FIG. 3B, since the maximum practical illumination angle is limited by increasing reflectivity of the glass substrate supporting the object (e.g., 110 in FIG. 1 or 300A in FIG. 3A) and the increasing impacts of multiple reflections within the substrate as the angle of incidence approaches 90°.

Still in the example of FIG. 3B, the frequency space coverage of each sub-image can correspond to two offset circles of diameter $2NA/\lambda=0.8/\lambda$ (i.e., the first offset) and a center offset of $\sin(\alpha_{ill})/\lambda$. In various embodiments, when the object (e.g., 110 in FIG. 1 or 300A in FIG. 3A) is characterized by transmission/reflection variations without involving any phase information (e.g., when thickness$<<\lambda$), single sideband imaging can be sufficient. That means, the diffracted plane waves to one side of the object only can be collected. The square law (intensity) response of the image formation process can restore the conjugated frequency space components, resulting in the two symmetric circles 310 and 320 in FIG. 3B for each sub-image. The off-axis illumination tilt $a_{ill}$ for these sub-images can be chosen to ensure that there is no overlap between the spectral coverage of the low-frequency sub-image (coherent illumination, frequency coverage extending out to $NA/\lambda$) and the offset images. In various embodiments, images can be improved by subtracting the dark-field sub-image (e.g., with the zero-order reference beam blocked). Often it is also advantageous to subtract background images with the object moved out of the field of view to remove artifacts arising from multiple partial reflections within the substrate.

At the highest available $a_{ill}$, the spectral content of the second offset sub-image can have significant overlap (see 350 in FIG. 3B) with that of the first offset sub-image for the specific parameters of this example. To provide a faithful combined image, it is necessary to exclude the double coverage of frequency space associated with these spectral overlaps. This can be accomplished by filtering the images either optically (with appropriate apertures in the back focal plane) or electronically once the images are recorded in digital form. In various embodiments, if the transition frequency space from one sub-image to another is near a region of high diffracted intensity, additional fringes can be generated in the image due to the Gibbs effect, which can be compensated by similar, out-of-phase, fringes in the complementary sub-image.

In various embodiments, in order to capture different ranges of frequency space, the angles of the off-axis illumination and the reference beam can be adjusted, to extend the coverage of frequency space. In some embodiments, the transition between frequency space regions can be chosen in a spectral region with low spectral intensity. In other embodiments, apodizing filters can be used, when high spectral intensities for the filter cut can not be avoided. This adjustment can allow coverage of spatial frequencies across a diameter of the available frequency space.

Often it is advantageous to also incorporate rotation of the object plane about the optical axis, or equivalently of the off-axis optical systems, both illumination and reference, about the optical axis in order to increase the coverage of frequency space (e. g. rotation of the object plane about the optical axis). This is because the rotation can allow circumferential coverage of frequency space at a constant radius of the available frequency space. When combined with the embodiment described in the previous paragraph, complete coverage of frequency space can be obtained.

Figure 4:
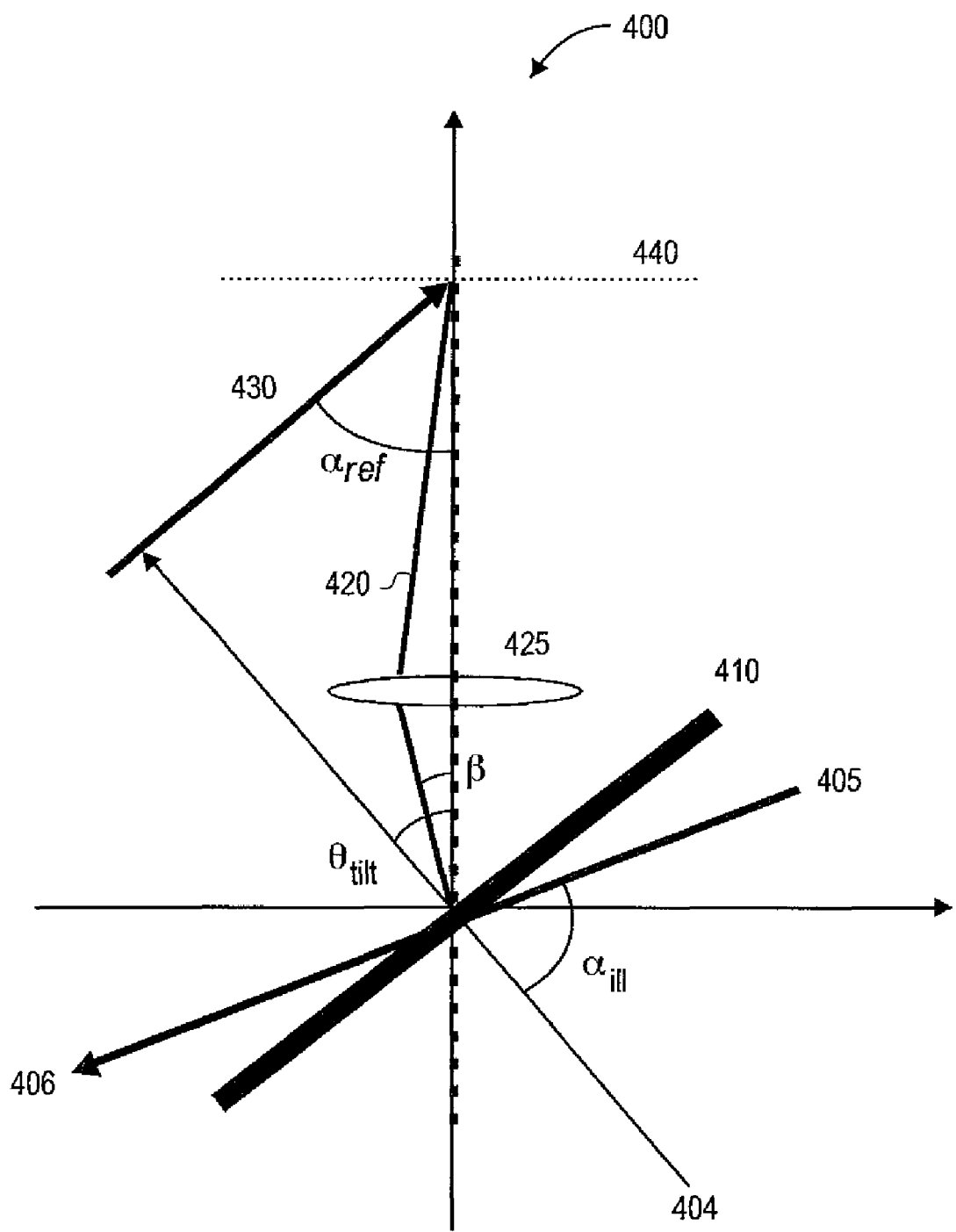
FIG. 4 depicts an additional exemplary IIM in accordance with the present teachings.

FIGS. 4-5 depict another exemplary IIM optical arrangement having an extension of frequency space coverage to about $2/\lambda$ in accordance with the present teachings. That is, the frequency space coverage can further be extended beyond $(1+NA)/\lambda$ by tilting the object plane of the IIM optical arrangement to capture high spatial frequencies, up to the transmission medium band pass limit of about $2/\lambda$ as shown schematically in FIG. 4. With straightforward adjustments, this arrangement can be applicable either to transmission or to reflection microscope geometries.

In FIG. 4, the depicted exemplary IIM optical arrangement 400 can include an oblique (i.e., off-axis) illumination at 405 having an incidence angle $\alpha_{ill}$. The off-axis illumination 405 can be incident on an object 410, providing diffracted information 420 from the object 410 and a zero-order beam 406. In this configuration, the object 410 can have a tilted angle $\theta_{tilt}$ made with respect to the optical axis 402. This tilt can be in the plane defined by the optical axis 402 and the direction of the off-axis illumination 405 (e.g. the plane of incidence). The diffracted information resulting from the off-axis illumination 405 can be directed into the bandpass of the objective lens 425. The zero-order beam can be brought around the objective lens 425, e.g., using a reflection mirror (not shown) through an auxiliary optical system (not shown), and interferometrically reintroduced on the low NA side of the objective lens 425. Alternatively, the reference beam can be split off from the illumination beam before the object plane and suitably reintroduced at the image plane (as shown in FIG. 2A). The interference between the zero-order beam 430 and the diffracted beams 420 transmitted through the objective lens 425 can shift the collected diffracted information and can reconstruct a sub-image.

As disclosed herein, the object, the objective lens, and the image plane in FIG. 4 can be similar as that in FIG. 1A and FIG. 2A. For example, an image device can be placed at the image plane for an optical-to-electronic signal conversion, and can include, for example, an electronic image recording camera that can be interfaced to a computer for recording the resulting image in suitable electronic forms and for further processing manipulation of the sub-images. The optical arrangement 400 can further increase the frequency space coverage beyond $(1+NA)/\lambda$ for the off-axis illumination arrangement by tilting the object plane.

It is known that the highest spatial frequency information within the bandpass of the transmission medium can correspond to illumination at grazing incidence and diffraction at grazing angles in the backward direction corresponding to a spatial frequency of about $2/\lambda$. Since tilting the object plane has an equivalent effect as moving the optical axis (e.g., 402) of the objective lens (e.g., 425) towards the object plane (e.g., 410), the high spatial frequency information can be captured by tilting the object plane.

In various embodiments, effective aperture ($NA_{eff}$) for this non-collinear multi-axis optical configuration (see the optical arrangement 400), corresponding to the maximum and minimum collected spatial frequencies, can be determined by the following equation (5) modified from the equation (1).

$$NA_{eff}|_{max,\,min}=[\sin(\theta_{tilt}\pm\sin^{-1}(NA))]+\sin a_{ill} \quad (5)$$

Where $\theta_{tilt}$, as shown in FIG. 4, can be the tilt angle of the object plane 410 with respect to the optical axis 402. The $2/\lambda$ transmission medium bandpass limit spatial frequency can be captured by an object plane tilted with $\theta_{tilt}=[90°-\sin^{-1}(NA)]$ (e.g., about 66.4° for NA=0.4 objective lens). However, according to the equation (5), the spatial frequency coverage can be significantly curtailed at this $\theta_{tilt}$. From equation (5), the frequency span captured in the direction along the object tilt can decrease as the tilt increases. Experimentally, for example, an object tilt of, e.g., about 39°, can be adopted as a compromise between capturing the highest spatial frequencies and minimizing the coverage gap between the first and second offset exposures, e.g., for a 0.4 NA objective lens. Meanwhile, in the orthogonal direction, the frequency range can be invariant to the tilt, so the covered frequency region can become elliptical, and the observed laboratory-frame frequencies can all be shifted as a result of the non-paraxial optical system, resulting in an image distortion in the laboratory frame image. Additional image processing can therefore be introduced to compensate the image distortion. A multiplicity of tilt angles may be necessary to provide a complete frequency space coverage. There is some redundancy of coverage adjustment between the off-axis illumination angle and the tilt angle (e.g. $\alpha_{ill}$ and $\theta_{tilt}$). The specific strategy chosen to maximize the spectral content will depend somewhat upon physical constraints of the optical components, the spectral content of the objects, and experimental convenience. Rotation of the object plane about the optic axis combined with these multiple sub-images in each position of the optic axis can be sufficient to provide a complete coverage of frequency space, the exact number of subimages required depends on the NA of the objective lens.

Referring back to FIG. 4, the incident illumination beam 405, the object tilt axis 404, and the reference beam 430 can be all in the same (≡x, z) plane. Alternatively, an additional sub-image with a different off-axis illumination angle can be used to provide for complete spectral coverage. For example, with the object tilt $\theta_{tilt}$=39°, objective NA=0.4, the diffraction angle β can be of between about −23.6° and about +23.6°. When the incident beam angle $\alpha_{ill}$=80° for the objective lens NA=0.4, the effective aperture according to equation (5) for the high frequencies along the tilt axis 404 can vary between about 1.25 and about 1.87, which results in a small gap of about ~3%, between about 1.20 and about 1.25, in the frequency space coverage between the inner shifted circles and the outer ellipses. In these examples, the object with 260-nm structures can have strong frequency content in the spectral region of the gap. As shown in FIG. 4, $\alpha_{ref}$ can be the incident angle of the reference beam 430 for the reconstruction of each sub-image.

Alternatively, in order to provide full coverage with a smaller number of sub-images, in some embodiments, a higher NA objective (e.g., about 0.5) can be used, which can entail overlapping frequency coverage for the multiple exposures and, however, require additional filtering. In other embodiments, smaller NA objectives can be used along with an increase in the number of the sub-images, although additional noise (both random and systematic, such as from multiple reflection effects and tilt/optical imperfections of the substrate) may be added from each sub-image. In an exemplary embodiment, an optimum NA to cover the full frequency space along a single spatial direction (e.g. the x-direction) with two offset images and a 39° object plane tilt can be about ~0.415. This can then require about four offset images for a Manhattan object for arbitrary objects to completely cover the frequency space along the x- and y-directions. Additional sub-images are required for arbitrary objects (it isn't eight because the long axis of the ellipse is fixed as the tilt is increased and it takes more subimages to cover all of frequency space. In various embodiments, using multiple sub-images can provide full coverage of frequency space; using a larger NA with deliberate overlaps between the regions, and/or removing multiple overlaps with signal processing, can provide the complete coverage for imaging arbitrary objects with a smaller number of sub-images.

Figure 5A:
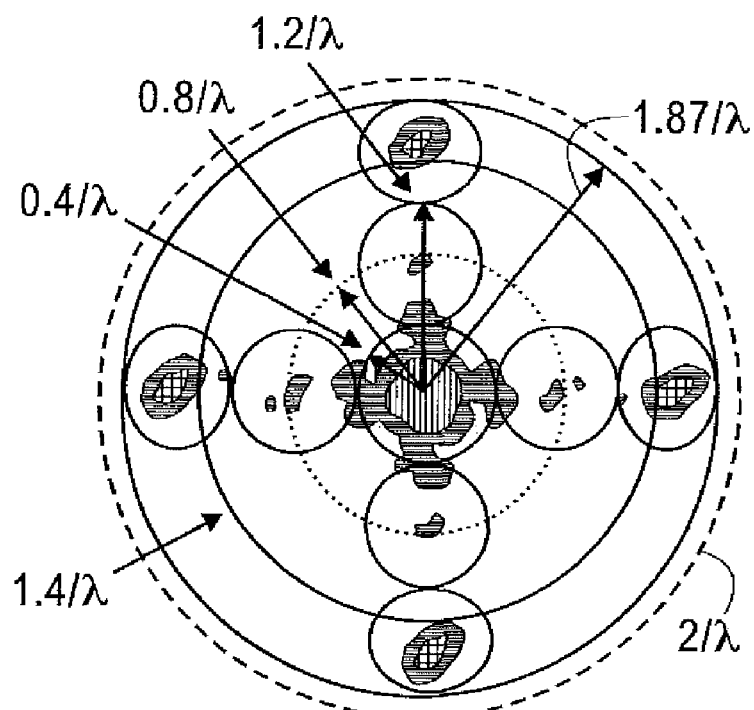
FIGS. 5A-5B depict frequency space coverage for exemplary object patterns using the IIM optical arrangement shown in FIG. 4 in accordance with the present teachings.
Figure 5B:
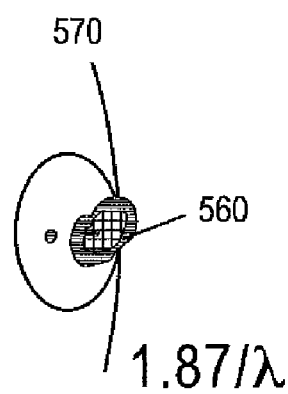

In an exemplary embodiment, the frequency space coverage using an NA=0.4 objective can be shown in FIG. 5A superimposed on the frequency space intensity plot for an object, e.g., having a 180-nm CD, with a similar structure as shown in FIG. 3A. In this case, the second pair of off-axis exposures with the object tilted can extend the frequency space coverage to, e.g., about 1.87/λ, as shown in FIG. 5A. In a further exemplary embodiment, decreasing the object CD, e.g., to about 170 nm, can move the corresponding frequency peak 560 to the edge of the collection limit 570 (see FIG. 5B) and the high-frequency sidebands around the center frequency of the pattern can not be collected, which may limit the resolution and result in the loss of spectral information.

From a geometric optics perspective, tilting the object plane can decrease the field-of-view because only a small portion of the object can be covered within the depth-of-focus of the optical system. For an exemplary experimental situation having a ~4-μm depth-of-focus (~λ/NA²) with $\theta_{tilt}$=39°, the field-of-view within the focus can be reduced to about 6.5 μm from the about 45-μm field observed under normal viewing conditions. This blurring is due to the non-paraxial frequency transformation noted above and can be corrected by signal processing that restores the correct image-frame frequencies from the shifted laboratory-frame frequencies.

Conical diffraction is known as a geometry wherein the plane of illumination (i.e., the plane of (x, z), defined by the propagation direction of the illumination beam (e.g., 405 in FIG. 4) and the object surface normal (e.g., 404 in FIG. 4), and the plane of observation (e.g., similarly defined with the substitution of the propagation direction of the diffracted beam) are not coincident. This is because the diffracted beams that lie on conic sections can become more curved as the angle of incidence is increased. Even for scattering confined to the (x, z) plane with a rotation between the surface normal and the optical axis, frequency shifts can be introduced for large-angle, non-paraxial optical systems as is evident from Equation 5.

For a tilted object plane (in the x-z plane), the tilt couples the propagation vector in the z-direction into the observed position in the laboratory-frame pupil plane requiring more detailed analysis to restore the correct image-frame frequencies. Note that for off-axis illumination (e.g., as shown in FIG. 1A) with the object plane normal (no tilt) to the optical axis, the tilts away from the z-axis can be unaffected by conical diffraction and the image can be unaffected and no corrections can be necessary.

Various parameters, such as, for example, position, angles of rotation, intensities of illumination and reference beams, etc., for each sub-image with or without object tilt can be adjusted for an accurate image reconstruction by estimating the quality of the resulting images. In various embodiments, the image quality can be estimated by various methods including, but not limited to: cross-correlation; applying a generalized Rayleigh criteria (e.g., requiring the intensity minimum between two features to be, e.g., at least 20% of the average intensity of the two features for every line scan through the image) and mean-square-error method (MSE). Many other image quality estimators are known in the field of image processing and are incorporated here without explicit reference. For example, the MSE method can be used to estimate image quality by comparing with the original object:

$$MSE = \frac{1}{N} \sum_i (I_i - I_i')^2, \tag{6}$$

where N is the number of pixels in the image, $I_i$ is image intensity from the MSE model, $I_i'$ is the image intensity. In various embodiments, the loss in information can be from, e.g., noise and systematic experimental errors based on the optical process (e.g. diffraction and imaging impacts). As a result, the dependence of the MSE model on CD indicated that the image resolution can be improved by nonlinear filtering (e.g., thresholding) of the images.

Figure 6A:
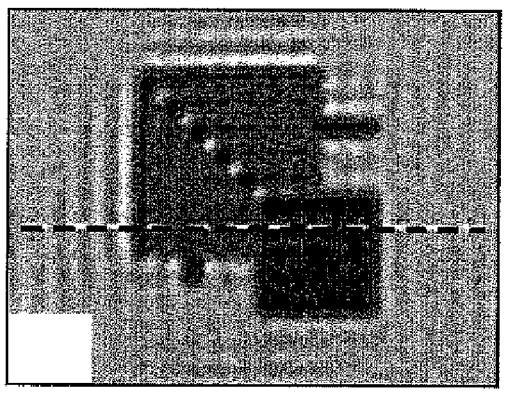
FIGS. 6A-6C depict exemplary results from a thresholding process in accordance with the present teachings.
Figure 6B:
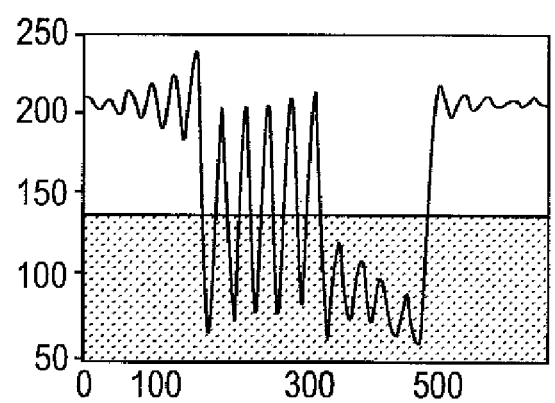
Figure 6C:
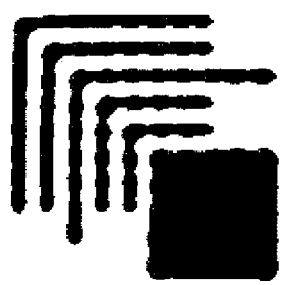

In an exemplary embodiment, a sigmoidal (threshold) filter can be applied electronically to the experimental gray-scale images to reconstruct, e.g., a binary image providing an improved optical resolution for images for which a binary representation is appropriate. FIGS. 6A-6C illustrate a thresholding process for an exemplary object pattern in accordance with the present teachings For example, the object pattern can be an 870-nm CD pattern. The gray-scale image is shown in FIG. 6A. As shown, extra features due to the Gibbs phenomenon can be clearly visible as weaker extra lines extending beyond the object region. FIG. 6B shows an x-direction cross cut along the dotted line in FIG. 6A and indicates the threshold intensity value used to generate the binary image that is shown in FIG. 6C. Comparing FIG. 6A with FIG. 6C shows image quality can be dramatically improved due to the use of the thresholding process, e.g., using the sigmoidal filter.

In various embodiments, the thresholding process for quality estimation can be used for each sub-image so that the resulting image can have minimum MSE referenced to the ideal pattern. For example, the optimum threshold can vary from about 35% to about 60% of the maximum intensity for different images.

In various embodiments, a full image reconstruction can include a sum of different frequency components collected in each of the sub-images, e.g., the low frequency sub-image (e.g., obtained using, for example, normal incidence illumination), the intermediate-frequency sub-images (e.g., taken at 53°, and corresponding to the inner pairs of offset circles of FIG. 3B in the x- and the y-directions), the high-frequency sub-images, and an exclusion of the overlapping frequency-space coverage. That is, different frequency components can be collected from each sub-image for the full image reconstruction, and multiple counting of any spectral components can be avoid to provide a uniform response across frequency space.

The overlapping frequency-space coverage can be corrected with appropriate pupil-plane filters (e.g., applied either electronically during the image reconstruction or optically with appropriate masks introducing into the back focal plane of the imaging system). The final reconstructed image can thus be in good agreement with the corresponding simulated reconstruction from MSE.

Image reconstruction and combination can require both scaling of the individual sub-image and the inter-sub-image registration. The sub-images can be determined by different optical arrangements (e.g., $\alpha_{ill}$, $\alpha_{ref}$, reference beam phase, $\theta_{tilt}$, etc.). For example, the "on-axis" sub-image can be formed with a conventional coherent illumination scheme and the scale can be determined by the optical system. However, the high spatial frequency sub-images can be formed in optical systems in which the 0-order and the diffracted frequency components pass through different arms of a Mach-Zehnder interferometer, which can lead to the need to adjust the intensity, the frequency (i.e., $\alpha_{ref}$), and the phase of the reference arm beam for each sub-image. In addition, the illumination angle can be adjusted to capture the correct range of frequencies. The reference beam can have the correct angle to reset the proper frequencies on the image side. Experimentally, the angle of the reference beam, $\alpha_{ref}$, can be set by monitoring the spatial frequency of its interference pattern with the normal incidence illumination zero-order beam transmitted through the optical system. The illumination angle, $\alpha_{ill}$, can then be set by monitoring the spatial frequency of the interference between the reference beam and the diffraction beam from a test object (such as a grating).

For a tilted object plane, the object tilt angle can also be adjusted by using a reference object and the first off-axis illumination, e.g., at about 53°. The intensity can be set by a comparison with the intensity from the simulation and/or from a test object for the same exposure.

In order to cover the dominant frequency space components in the x- and y-directions for Manhattan geometry structure, pairs of orthogonal off-axis illumination angles can be employed. In various embodiments, the object can be rotated or multiple-beam optical systems can be used for off-axis illuminations.

In preliminary experiments, the adjustments to the optical system for different illumination angles and different rotations of the object plane are made manually. It is understood that automating the sequence of sub-images, most likely by providing a multiplicity of illumination and reference angles and switching between the multiple optical configurations with electronically controlled shutters, can provide a more robust and user-friendly microscopy system.

In various embodiments, each experimental sub-image can contain a reference object over the corresponding simulated sub-image with different parameters in order to optimize position and angle of the experimental sub-image determined by the minimum MSE in the MSE matrix. Likewise, the relative intensities can be determined using the reference object and the MSE matrix.

The reference object can be chosen to cover a small part of the image field to assist in setting the relevant angles and phases of the reference beam, and to provide sufficient precision for position determination as well as for correction of other parameters such as angles of rotation and intensities. In some embodiments, the reference object can be placed as close as possible to the unknown test objects. For example, high frequency images can be very sensitive to vibrations and to the resultant phase shifts of the sub-images. The reference object can thus be useful for determining the correct phase. The intensity of the object illumination can be typically set to allow using the full dynamic range of, e.g. the camera, for each sub-image. When adding the sub-images together, the relative intensities can be adjusted with respect to intensities from the model sub-images. Therefore, it is important to have appropriate reference objects work along with any unknown object and mostly, the closer the similarity of the reference object (known) to the test object (unknown), the more accurate the final result.

In an exemplary experiment, a known Manhattan structure having a pattern with CD=240 nm can be used as a reference object to reconstruct similar patterns with different CDs including, Manhattan structures with a CD of about 260 nm. The crosscut results (not illustrated) can show the matching of the periodic structures as well as the matching of the distance between the objects. Still in this example when using the CD of about 240 nm as a reference object, the structures with CD of about 220 and about 210 nm can be beyond the resolution limit for the used optical arrangement.

These patterns can further be resolved by tilting the object plane, which requires additional signal processing This is because tilting the object plane can introduce significant aberrations into the optical system as a direct consequence of non-paraxial effects (e.g. conical diffraction) that creates a nonlinear mapping between the actual (image frame) and the observed (laboratory frame) spatial frequencies of the diffracted fields.

For the tilted object plane, the frequency correction can be accomplished in several steps: first a real-space dark field image can be subtracted; then a generalized (also called shifted or offset) fast Fourier transform (FFT) of the experimental (distorted laboratory frame) high-frequency image can be taken to provide a frequency space image; and the experimental frequencies can be corrected according to an equation (not shown) between the image-frame frequency in terms of the laboratory frame observables. In this manner, the reference beam can be adjusted to a known frequency of a reference object and all other frequencies can be recalculated.

The use of a shifted FFT can be required because the origin of the FFT can be taken within the "in-focus" region of the experimental image, where the phases (positions) of the image special frequencies are invariant to the object tilt. The resulting frequency space spectrum can thus be non-suitable for an inverse FFT since the new frequencies are no longer on a regular grid. Instead, a more computationally intensive Fourier sum with off-grid frequencies can be used for the inverse transform to the image frame, which can provide restoration of the field-of-view (FOV). Again, the rich apparati developed by the image processing community can be applied and are incorporated here without explicit reference.

Referring back to the exemplary experiment wherein the 240 nm CD is used as reference object to reconstruct similar patterns with CDs of about 210 nm and 220 nm, the tilting of the object plane can facilitate the reconstruction procedure to restore images and to improve the field of view. In various embodiments, application of tilted sub-images and their integration with lower frequency sub-images can require precise knowledge of the object tilt and incident illumination offset in order to obtain high-quality, extended-field images. In various embodiments, the reconstructed images of about 180-nm CD structures can be obtained, while the reconstructed images of about 170-, 140-, and 130-nm CD structures require an immersion of the sample object.

Figure 7A:
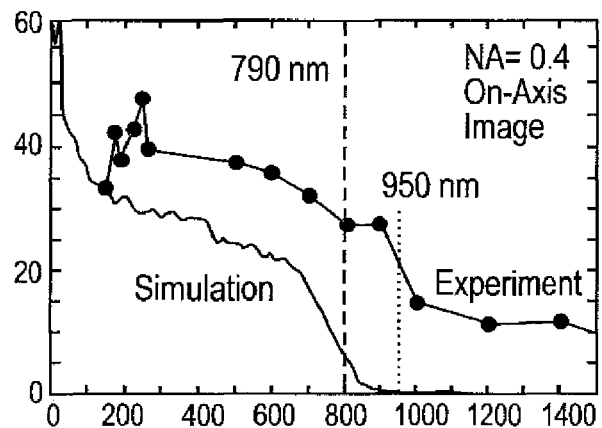
FIGS. 7A-7C depict exemplary results for various thresholded IIM images using MSE (mean square error method) quality estimation of the experimental results in accordance with the present teachings.
Figure 7B:
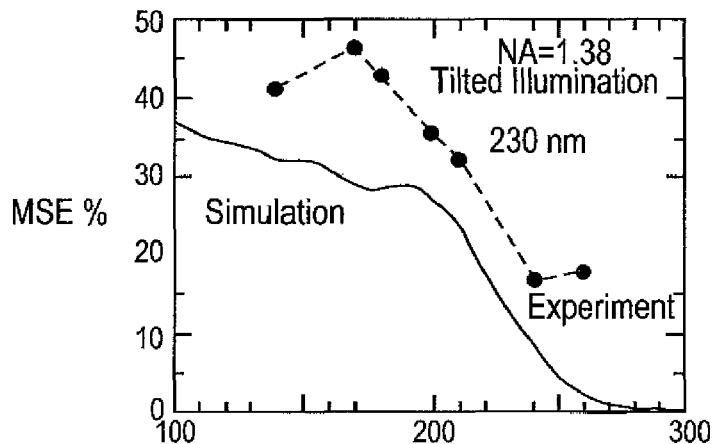
Figure 7C:
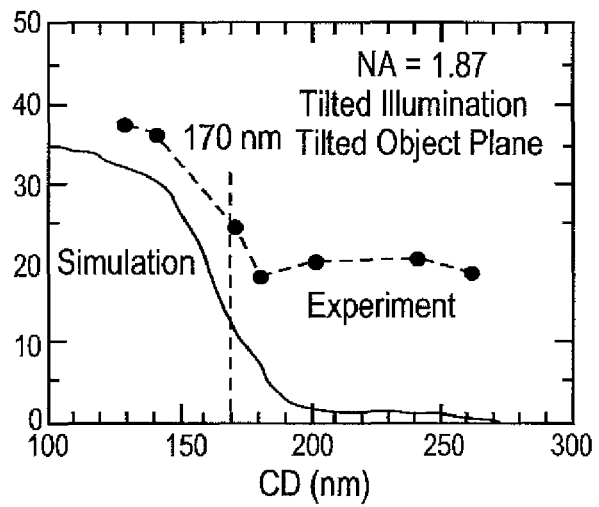

FIGS. 7A-7C depict exemplary results for various thresholded IIM images using MSE quality estimation of the experimental results in accordance with the present teachings. Specifically, FIG. 7A, FIG. 7B, and FIG. 7C depict both the simulated IIM and experimental MSE curves for thresholded images with on-axis illumination (NA=0.4), off-axis illumination ($NA_{eff}$=1.38), and off-axis illumination with tilted object ($NA_{eff}$=1.87), respectively.

In FIG. 7A, the experimental MSE curve resembles the theoretical MSE curve, but with a vertical shift (indicating the impact of experimental errors and noise). For example, the MSE of the simulation with about 1200-nm CD is almost 0%, while it is about 11.8% for the experiment. Also, the resolution limit can be shifted to the right (poorer resolution) for the experimental results to around 900 nm instead of 790 nm for on-axis illumination.

In FIG. 7B, the noise level of the multiple sub-image, reconstructed images can be higher in comparison with the on-axis image (see FIG. 7A), because of the added noise from several sub-images. For example, the MSE of the resolved reconstructed images can be around 18%. However, the MSE value can be increased as the resolution limit is approached. This allows estimating the MSE as about 22% at resolution limit calculated by the Rayleigh criteria for NA=1.38 (CD=230 nm), and as about 24% at the resolution limit for the system with a tilted object plane, where NA=1.87, and CD=170 nm (see FIG. 7C).

In summary, the disclosed imaging interferometric microscopy (IIM) can provide an improved optical resolution by an extension of the effective NA, retaining the large depth-of-field, the large field-of-view and the large working distance of a low-NA objective. In one embodiment for Manhattan objects, extension of NA to $NA_{eff}$=1+NA can be achieved by using a plurality of offset partial images, e.g., with two off-axis sub-images, in the x- and y-directions. For this object, it was not necessary to capture spatial frequencies far from the x-, y-axes. In another embodiment for arbitrary objects, a suitable reference object can be chosen to cover a small part of the image field to assist in setting the relevant angles and phases of the reference beam. For example, for a binary object, significant resolution improvement can be achieved by using a nonlinear sigmoidal filter to the gray-scale images. Tilting the object plane and transforming the observed (laboratory frame) spatial frequencies to image-frame spatial frequencies can extend the resolution to the transmission medium bandpass limit, e.g., of $\geq \lambda/4$. Electronic merging of sub-images can offer many opportunities for image processing optimization. IIM can be applicable to phase shift mask metrology and can be useful for grating inspection.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for microscopy comprising:
    illuminating an object at an object plane using an illumination beam having an illumination angle to the object plane, wherein the illumination angle is one of a plurality of illumination angles;
    recording a sub-image at an image plane based on the illumination at the object plane, wherein the sub-image corresponds to one region of a plurality of spatial frequency regions of a frequency space;
    enhancing each sub-image that corresponds to each region of the plurality of spatial frequency regions that is based on each illumination angle of the plurality of illumination angles using signal processing algorithms; and
    combining each enhanced sub-image of the plurality of sub-images to assemble a composite image of the object, wherein the frequency space covered in the plurality of sub-images extends to $(1+NA)n/\lambda$ or less, wherein NA is a numerical-aperture of an objective lens, $\lambda$ is an optical wavelength of the illumination beam, and n is a refractive index of a transmission medium.

2. The method of claim 1, wherein forming each sub-image comprises,
    collecting a 0-order transmission and re-injecting the 0-order transmission onto the image plane;
    collecting the diffracted information within the NA of the objective lens; and
    arranging for an interferometric reconstruction of the spatial frequency sub-image.

3. The method of claim 2, further comprising one or more of a transmission geometry and a reflection geometry.

4. The method of claim 1, wherein forming each sub-image comprises re-directing and re-injecting a portion of the illumination beam around the object into an optical system beyond the objective lens to act as an effective 0-order transmission at the image plane.

5. The method of claim 4, further comprising one or more of a transmission geometry and a reflection geometry.

6. The method of claim 1, wherein each illumination angle with respect to an optical axis of a collection optical system is of about 0 degree to about 90 degree.

7. The method of claim 1, further comprising a first sub-image and a second sub-image that correspond to orthogonally related regions of the frequency space for a Manhattan geometry object and a third sub-image acquired to cover a plurality of low spatial frequency regions of the object.

8. The method of claim 1, further comprising rotating the object plane relative to an optical axis of a collection optical system or rotating an illumination beam to record the plurality of sub-images to provide a 2-dimensional coverage of the frequency space.

9. The method of claim 1, wherein using signal processing algorithm comprises one or more processes of subtraction of dark-field images, subtraction of background images, and electrical or optical elimination of one or more coverages of the frequency space.

10. The method of claim 1, further comprising tuning a parameter of each sub-image, wherein the parameter comprises one or more of a phase-shift base, an illumination angle, a rotation angle, a position and an intensity base, and wherein the tuning comprises,
introducing a reference object into field of view or knowing a-priori knowledge about the object;
estimating an uncertain parameter based on an error metric comparing the a-priori known part of data with a measured data; and
minimizing the error metric to find a parameter setting.

11. The method of claim 1, further comprising applying a thresholding process to an experimental gray-scale image for an improved resolution for each sub-image of a binary object.

12. The method of claim 11, further comprising covering an orthogonal frequency space for a Manhattan object by about four sub-images or more.

13. The method of claim 11, further comprising increasing a frequency coverage for an arbitrary object by one or more of using additional sub-images to cover a plurality of regions of unrecorded frequency space between a plurality of covered circular and elliptical regions; using a larger NA objective lens with deliberate overlaps, and removing the overlap, electronically or optically, using a set of pupil-plane filters.

14. The method of claim 1, further comprising tilting the object plane to access a higher spatial frequency having an object tilt angle of about 0° to about $(90°-\sin^{-1}(NA))$.

15. The method of claim 1, wherein the frequency space coverage is extended to about $2n/\lambda$ or less by incorporating the plurality of illumination angles with one or more of tilts of the object plane relative to an optical axis of a collection optical system, wherein n is a refractive index of the transmission medium and $\lambda$ is an optical wavelength.

16. The method of claim 15, further comprising a frequency correction process comprising,
obtaining a real-space intensity sub-image corresponding to a region of the frequency space;
subtracting one or more of a real-space dark field image and a background image;
providing a frequency space image by taking a Fourier transform of the subtracted image;
correcting an experimental frequency space image according to a signal processing algorithm to provide an image-frame frequency space image; and
transforming the corrected frequency space result to a real-space linear sub-image with an appropriate inverse transform.

17. The method of claim 15, further comprising a complete radial coverage with three sub-images having a first sub-image and a second sub-image with the object plane normal to the optic axis and a third sub-image with an object tilt angle of about 39° for an NA of about 0.4 or higher.

18. The method of claim 1, further comprising,
automating a sequence of a plurality of operations for obtaining the composite image that is free of an operator intervention.

19. A method for microscopy comprising:
recording a first plurality of sub-images of an object at an object plane with a plurality of illumination beams substantially within the NA of an optical system to the object plane;
electronically storing the first plurality of sub-images that a composite sub-image corresponds to a real-space image with low spatial frequency content up to about $NA/\lambda$, where $\lambda$ is the wavelength of the illumination;
optionally recording one or more additional sub-images of the object plane with the object removed and with blocking the zero-order transmission of the illumination;
using signal processing to obtain a linear imaging sub-image;
recording one or more additional sub-images of the object plane with each covering different portions of spatial frequency space; and
combining the first plurality of sub-images and the one or more additional sub-images to form a composite image of the object including spatial frequencies within all of the regions of frequency space.

20. The method of claim 19, further comprising repeating a step of recording a second sub-image with the object plane tilted with respect to an optical axis of an optical system to provide a tilted sub-image of the object with additional frequency content and using signal processing to adjust spatial frequencies in the tilted sub-image.

21. The method of claim 20, wherein recording the second sub-image of the object comprises:
adjusting the illumination system to provide illumination of the object at an angle of incidence substantially beyond the NA of the optical system;
bringing a portion of the illumination beam to the low-NA side of an objective lens and reinserting the illumination beam to interfere with the diffracted information from the object transmitted through the objective lens at an image plane to reconstruct a different sub-image covering a different segment of spatial frequency space; and
optionally recording additional sub-images with the illumination of the object blocked and with a portion of the illumination brought around the objective blocked and using signal processing to adjust the second sub-image to obtain a linear imaging sub-image.

22. The method of claim 21, wherein a plurality of sub-images is recorded sufficient to cover the available frequency space and the sub-images are combined with appropriate signal processing optimization to provide a complete image of the object plane within the field-of-view of the objective lens.

* * * * *